United States Patent Office 2,757,594
Patented Aug. 7, 1956

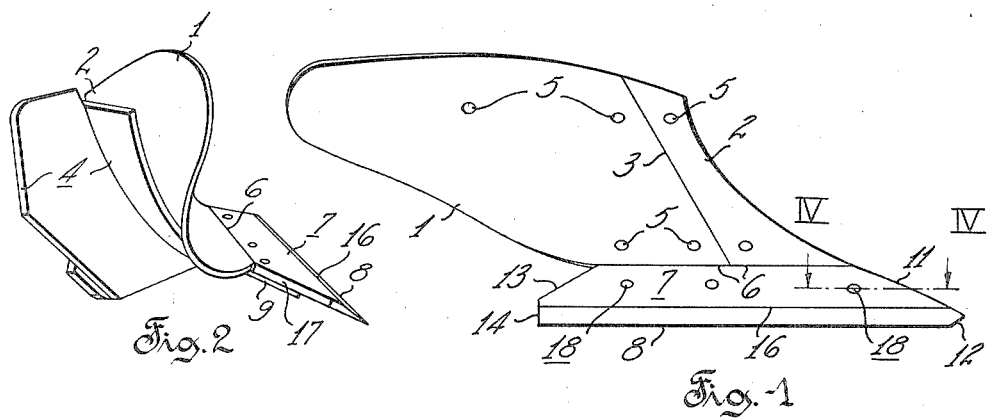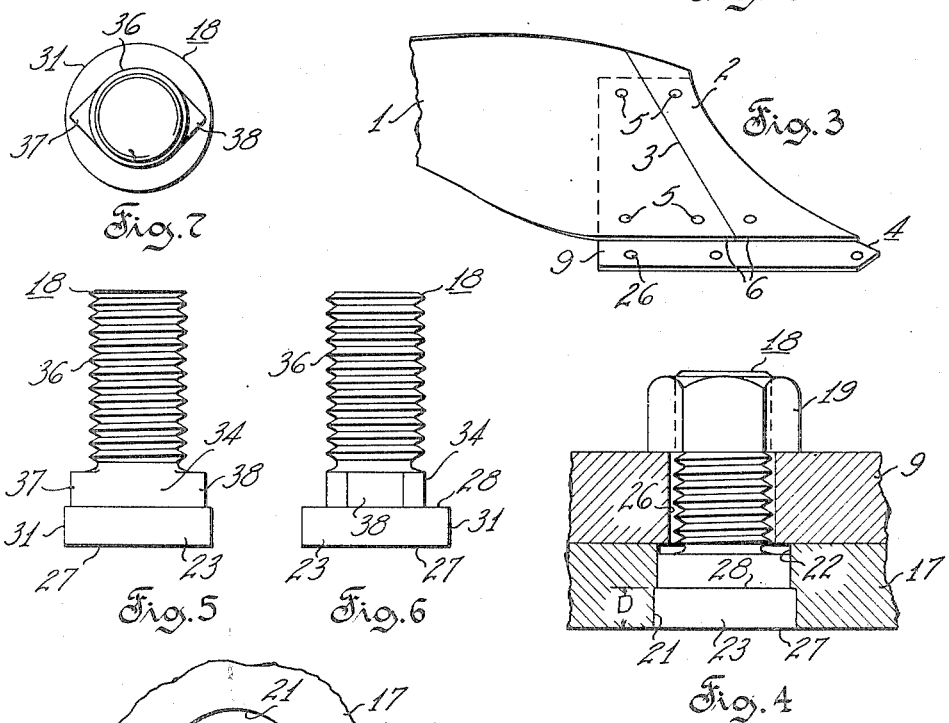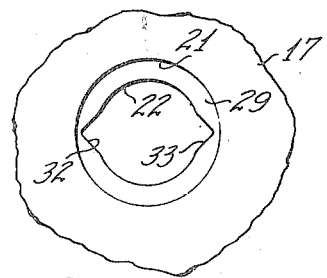

2,757,594

PLOWSHARE MOUNTING

Willard H. Tanke, La Crosse, Wis., assignor to Allis-Chalmers Manufacturing Company, Milwaukee, Wis.

Application August 26, 1954, Serial No. 452,392

1 Claim. (Cl. 97—125)

The invention relates to plows, and it is concerned more particularly with a plow bottom assembly for moldboard plows and the like, wherein a cutting edge is formed on a "throw-away" type of share, that is, a share which is intended to be replaced rather than reconditioned when it has become dull or nonusable due to wear.

A particular problem which has been encountered during the past with throw-away type shares is the matter of enabling the farmer to make the replacement properly so that the plow bottom after installation of a new share will have a smooth working face and operate substantially as efficiently as a factory new unit. Heretofore, it has been customary to use conventional conical head plow bolts for securing the share to the frog of the plow bottom, and with such bolts the farmer has, as a rule, not been able to replace a share without having the heads of these bolts either project beyond the working face of the share or to have the heads sink too deeply into the share so as to leave a cavity or recess in which soil would accumulate. If the bolt head is too high and projects beyond the working face of the share it causes drag and scouring difficulties, a fact well known not only to farmers but to plow manufacturers as well.

Generally, it is an object of the invention to provide an improved plow bottom assembly incorporating a throw-away type of share, and one which may readily be serviced by a farmer in a practical and entirely satisfactory manner.

More specifically, it is an object of the invention to provide an improved plow bottom assembly incorporating a throw-away type of share and fastening bolts therefor, the share and bolts, when replaced, matching accurately so that the bolt heads will be substantially flush with the working face of the share, and so that it will not be necessary to grind off any projecting bolt heads after a new share and new fastening bolts therefor have been installed.

A further object of the invention is to provide an improved plow bottom assembly of the hereinbefore mentioned character in which wear of the share and of the heads of the fastening bolts for the share will be less apt to loosen the mounting of the share than similar wear in a plow bottom assembly using conventional conical head fastening bolts.

A further object of the invention is to provide an improved plow bottom assembly of the hereinbefore mentioned character which is of utmost simplicity and lends itself to mass production at relatively low cost.

These and other objects and advantages are attained by the present invention, various novel features of which will be apparent from the description herein and the accompanying drawings disclosing an embodiment of the invention, and will be more particularly pointed out in the appended claim.

Referring to the drawings:

Fig. 1 is a side view of a plow bottom assembly;

Fig. 2 is a rear view of the plow bottom assembly shown in Fig. 1;

Fig. 3 is a fractional view of the assembly shown in Fig. 1 with parts omitted for purposes of exposure;

Fig. 4 is an enlarged section on line IV—IV of Fig. 1;

Figs. 5, 6 and 7 are detail views of a bolt shown in Fig. 4; Fig. 6 being a side view of Fig. 5; and Fig. 7 being a top view of Fig. 5; and Fig. 8 is a partial bottom view of Fig. 4, with the bolt removed for purposes of exposure.

The moldboard assembly shown in Figs. 1 and 2 comprises two curved plate sections 1 and 2 adjacent to each other along line 3, and a frog structure generally designated by the reference character 4 at the rear side of the plate sections 1 and 2. The plate sections 1 and 2 are secured by bolts 5 to the frog structure 4, and in the assembled condition in which they are shown in Figs. 1 and 2, the two plate sections 1 and 2 form a curved moldboard having a straight lower edge 6. The moldboard assembly shown in Figs. 1 and 2 further comprises a share plate, generally designated by the reference character 7, and having a cutting edge 8.

In Fig. 3, the share plate 7 is omitted and the frog structure 4 is shown as having a marginal portion 9 which projects beyond the lower edge 6 of the curved moldboard 1, 2. The frog structure 4 is preferably frabricated from plate metal stock, and the marginal portion 9 is flat or plane in the direction of its length, that is, in the longitudinal direction of moldboard edge 6, as well as transversely of the edge 6, as may be seen from Figs. 2 and 3.

The share plate 7 has a straight upper edge which extends along the straight lower edge 6 of the moldboard; a forwardly and downwardly slanting leading edge 11 merging at its forward end with a short rearwardly slanting point edge 12; a rearwardly and downwardly slanting trailing edge 13; and a short transverse rear edge 14 at right angles to the cutting edge 8. A level surface at the forward or working side of the share 7 extends lengthwise of the latter from the transverse rear edge 14 to the leading edge 11 and point edge 12 so as to form the cutting edge 8. The line 16 in Fig. 1 designates the upper edge of the bevel surface and also the lower boundary line of a planar surface at the working face of the share plate; the upper boundary line of said planar surface being formed by the longitudinal upper edge of the share plate, and the rear boundary line of said planar surface being formed by the trailing edge 13 and part of the rear edge 14. At the forward end of the share the planar upper surface terminates in proximity to the leading edge 11. The rear face of the share presents a planar surface which is bounded by the cutting edge 8, trailing and rear edges 13, 14, and top edge of the share along lower moldboard edge 6. At the forward end of the share the planar rear face terminates in proximity to the leading edge 11, it being understood that the share plate might be reinforced or thickened at its point and along the leading edge 11 if desired. In the drawings no such reinforcement has been shown for the sake of clarity and simplicity.

As shown in Fig. 2, the upper portion of the share plate 7 overlies the marginal portion 9 of the frog 4, and it will be noted that the attaching portion 17 of the share plate which overlies the marginal portion of the frog is plane at the working face of the share, as distinguished from shares which are curved at the working side in conformity with the curvature of the moldboard. The share 7 is detachably secured to the marginal portion 9 of the frog 4 by means of three bolts 18, one of which is shown enlarged in Figs. 4 to 7, and each of which has a nut 19 at the rear side of and bearing axially against the marginal portion 9 of the frog 4.

Referring to Figs. 4 and 8, the plane attaching portion 17 of the share plate has a counterbored bolt hole affording a bolt head receiving recess 21 which extends to a predetermined depth D into the share plate from the working face toward the rear face of the latter. The counterbored hole in the plane attaching portion 17 of the share plate, as shown in Figs. 4 and 8, further affords a bolt shank receiving aperture 22 of an area smaller than the cross sectional area of the recess 21.

Referring to Fig. 4, and also to Figs. 5 to 7, the bolt 18 has a disk head 23 within the recess 21, and a shank 34 which extends through the aperture 22 and through a registering hole 26 in the marginal portion 9 of the frog 4. The disk head 23 presents a plane top surface 27 flush with the planar surface at the working face of the share plate; and at its under side the disk head 23 has a seating surface 28 at subtantially right angles to its axis and in axial load transmitting engagement with the bottom 29 (Fig. 8) of the recess 21.

The height of the disk head 23, that is, the axial spacing between the top surface 27 and the seating surface 28 closely conforms with the depth D of the recess 21, and when the nut 19 on the bolt is drawn up tight against the rear face of the marginal portion 9 of the frog, proper positioning of the bolt so as to align its plane top surface 27 with the planar surface at the working face of the share plate will be automatically insured. The foregoing explanations with reference to the bolt 18 which is positioned next to the leading edge 11 of the share plate 7 shown in Fig. 1 similarly apply to the other two bolts 18 which are installed as shown in Fig. 1 for securely but detachably fastening the share plate to marginal portion 9 of the frog 4.

In the illustrated embodiment of the invention the bolt head receiving recess 21 in the share plate 17 is cylindrical on an axis at right angles to the plane of the share plate, and the disk head 23 has a cylindrical peripheral surface 31 of a diameter substantially equal to the diameter of the recess 21. The diameter of the disk head 23 is preferably slightly smaller than the diameter of the recess 21, in conformity with reasonably practical tolerances, as for instance 4 to 26 thousandths of an inch. This will insure ready insertion of the bolt into and its removal from the share plate and leave no objectionally wide circumferential gap around the bolt head.

It should also be noted that wear of the share and bolt head does not decrease the area on which axial thrust load is transmitted from the bolt to the share, that is, at the under side of the disk head. Consequently, the share will stay in place within the assembly more securely and longer than in a conventional construction in which conical head plow bolts are used to fasten the share in place.

Provisions are ordinarily required to prevent turning of the bolt during tightening and loosening of the nut 19. For that purpose the bolt shank receiving aperture 22 of the share plate is made noncircular, as shown in Fig. 8, by providing it with two radially outward projecting V-notches 32 and 33. These notches are preferably formed by a piercing tool and extend from the bottom of the recess 21 clear to the rear face of the share plate. The bolt 18 has a nonthreaded shank portion 34 between the disk head 23 and the adjacent end of the threads 36. The shank portion 34 has a noncircular cross section conforming with the noncircular contour of the aperture 22 shown in Fig. 8, V-lugs 37 and 38 being formed on the nonthreaded shank portion 34 for cooperative engagement with the V-notches 32 and 33, respectively.

It should be understood that it is not intended to limit the invention to the hereinabove described forms and details, and that the invention includes such other forms and modifications as are embraced by the scope of the appended claim.

It is claimed and desired to secure by Letters Patent:

In a moldboard plow, the combination of a curved moldboard, a frog structure connected to the rear side of said moldboard and having a marginal portion projecting beyond a lower edge portion of said moldboard, a share plate having a plane attaching portion in overlying relation to said marginal portion of said frog structure, said share plate having a plurality of counterbored bolt holes in said plane attaching portion thereof each affording a cylindrical bolt head receiving recess extending to a predetermined depth on an axis at right angles to the plane of said share plate, and each of said bolt hole recesses terminating at its lower end in a shoulder presenting a seating surface parallel to the working surface of the plane attaching portion of the share plate, and a bolt shank receiving aperture of noncircular contour and of an area smaller than the cross sectional area of said recess; bolts inserted, respectively, into said bolt holes and extending through registering bolt holes, respectively, in said marginal portion of said frog structure; each of said bolts having a cylindrical disk head having a flat top surface and a parallel bottom surface, with said disk head top and bottom surfaces at right angles to the axis of the bolt and spaced from each other a distance equal to said predetermined depth, so that said disk head when seated within its associated cylindrical share plate recess will be flush with said working surface, and a noncircular shank portion seated within and matching the respective shank receiving aperture; and tightening nuts on said bolts, respectively, at the rear side of and bearing against said marginal portion of said frog structure.

References Cited in the file of this patent

UNITED STATES PATENTS

| | | |
|---|---|---|
| 578,849 | Alexander | Mar. 16, 1897 |
| 1,230,686 | Dixon | June 19, 1917 |
| 1,822,657 | Horton | Sept. 8, 1931 |
| 2,519,326 | Temple | Aug. 15, 1950 |